(12) United States Patent
Ewing et al.

(10) Patent No.: US 11,707,141 B2
(45) Date of Patent: *Jul. 25, 2023

(54) ANTI-THEFT PUSHER WITH INCREMENTAL DISTANCE DETECTION

(71) Applicant: Fasteners for Retail, Inc., Twinsburg, OH (US)

(72) Inventors: Brent O. Ewing, Roscoe, IL (US); Chan Chor Man, Tai Po (HK)

(73) Assignee: Fasteners for Retail, Inc., Twinsburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,496

(22) Filed: Apr. 22, 2022

(65) Prior Publication Data

US 2022/0240693 A1 Aug. 4, 2022

Related U.S. Application Data

(63) Continuation of application No. 16/839,667, filed on Apr. 3, 2020, now Pat. No. 11,363,894.

(Continued)

(51) Int. Cl.
*A47F 1/12* (2006.01)
*G08B 21/18* (2006.01)
*G07F 9/02* (2006.01)

(52) U.S. Cl.
CPC ............. *A47F 1/126* (2013.01); *G07F 9/02* (2013.01); *G08B 21/182* (2013.01)

(58) Field of Classification Search
CPC ...... A47F 1/126; A47F 2010/025; G07F 9/02; G07F 11/22; G07F 11/42; G08B 21/182; G08B 13/1436

(Continued)

(56) References Cited

U.S. PATENT DOCUMENTS 2,358,658 A 9/1944 Riche et al.
2,398,411 A 4/1946 Cook (Continued)

FOREIGN PATENT DOCUMENTS

CA 3054574 A1 8/2018
DE 202005010088 U1 9/2005

(Continued)

OTHER PUBLICATIONS

U.S. Appl. No. 16/839,667, filed Apr. 3, 2020.

(Continued)

*Primary Examiner* — Zhen Y Wu
(74) *Attorney, Agent, or Firm* — Reinhart Boerner Van Deuren P.C.

(57) ABSTRACT

A retail merchandise pusher is configured for sliding along a pusher assembly track. The pusher assembly is mountable to a retail merchandise shelf. The pusher includes a housing, a spring drum rotatably mounted within the housing, and a coil spring mounted to the spring drum. The coil spring is coilable and uncoilable upon rotation of the spring drum. A controller is coupled to a sensor arrangement within the housing. The sensor arrangement has a spring drum sensor for detecting rotation of the spring drum. A direction sensor detects a direction of rotation of the spring drum. An incremental distance sensor detects incremental movement of the pusher. The controller is configured to calculate, based on data from the sensor arrangement, a total distance and direction of travel by the pusher, and to generate an alarm when the pusher travels more than a threshold distance within a predetermined period of time.

26 Claims, 9 Drawing Sheets

Related U.S. Application Data

(60) Provisional application No. 62/830,045, filed on Apr. 5, 2019.

(58) Field of Classification Search
USPC .......................................................... 340/500
See application file for complete search history.

(56) References Cited

U.S. PATENT DOCUMENTS

| | | |
|---|---|---|
| 2,996,593 A | 8/1961 | McMains |
| 3,550,121 A | 12/1970 | Porter |
| 3,706,309 A | 12/1972 | Toftness |
| 3,848,745 A | 11/1974 | Smith |
| 3,852,735 A | 12/1974 | Matsuda et al. |
| 3,983,341 A | 9/1976 | Stanish |
| 4,001,805 A | 1/1977 | Golbe |
| 4,020,305 A | 4/1977 | Schwartz |
| 4,021,796 A | 5/1977 | Fawcett, Jr. et al. |
| 4,122,437 A | 10/1978 | Petersen |
| 4,166,273 A | 8/1979 | Riley, Jr. et al. |
| 4,227,188 A | 10/1980 | Petersen |
| 4,269,025 A | 5/1981 | Kondo |
| 4,289,242 A | 9/1981 | Kenyon |
| 4,311,889 A | 1/1982 | Blanchard et al. |
| 4,352,170 A | 9/1982 | Jetter |
| 4,352,171 A | 9/1982 | Jetter |
| 4,370,069 A | 1/1983 | Nomura |
| 4,383,242 A | 5/1983 | Sassover et al. |
| 4,384,906 A | 5/1983 | Molinari et al. |
| 4,470,236 A | 9/1984 | MacDonald, Jr. |
| 4,475,658 A | 10/1984 | Roberts |
| 4,675,654 A | 6/1987 | Copeland |
| 4,712,694 A | 12/1987 | Breslow |
| 4,718,626 A | 1/1988 | Thalenfeld et al. |
| 4,742,923 A | 5/1988 | Calvert |
| 4,821,894 A | 4/1989 | Dechirot |
| 4,830,201 A | 5/1989 | Breslow |
| 4,836,390 A | 6/1989 | Polvere |
| 4,870,228 A | 9/1989 | Speer et al. |
| 4,887,737 A | 12/1989 | Adenau |
| 4,899,668 A | 2/1990 | Valiulis |
| 4,901,869 A | 2/1990 | Hawkinson et al. |
| 4,942,386 A | 7/1990 | Willis |
| 4,962,367 A | 10/1990 | Tymn |
| 4,967,044 A | 10/1990 | Speer et al. |
| 5,009,334 A | 4/1991 | Bodkins |
| 5,068,643 A | 11/1991 | Yashina |
| 5,083,638 A | 1/1992 | Schneider |
| 5,114,021 A | 5/1992 | Fredrickson |
| 5,161,704 A | 11/1992 | Valiulis |
| 5,168,263 A | 12/1992 | Drucker |
| 5,222,608 A | 6/1993 | Eklof et al. |
| 5,240,126 A | 8/1993 | Foster et al. |
| 5,255,182 A | 10/1993 | Adams |
| 5,265,738 A | 11/1993 | Yablans et al. |
| 5,317,304 A | 5/1994 | Choi |
| 5,335,892 A | 8/1994 | Busch |
| 5,397,856 A | 3/1995 | Lee |
| 5,434,559 A | 7/1995 | Smiley et al. |
| 5,570,080 A | 10/1996 | Inoue et al. |
| 5,641,077 A | 6/1997 | Tufano et al. |
| 5,671,851 A | 9/1997 | Johnson et al. |
| 5,685,664 A | 11/1997 | Parham et al. |
| 5,690,238 A | 11/1997 | Schmehr |
| 5,730,320 A | 3/1998 | David |
| 5,748,082 A | 5/1998 | Payne |
| 5,757,270 A | 5/1998 | Mori |
| 5,838,225 A | 11/1998 | Todd |
| 5,839,588 A | 11/1998 | Hawkinson |
| 5,855,282 A | 1/1999 | Hardy |
| 5,906,283 A | 5/1999 | Kump |
| 5,955,951 A | 9/1999 | Wischerop et al. |
| 5,971,173 A | 10/1999 | Valiulis et al. |
| 5,979,674 A | 11/1999 | Thalenfeld |
| 5,995,003 A | 11/1999 | Rogers |
| 6,041,720 A | 3/2000 | Hardy |
| 6,049,268 A | 4/2000 | Flick |
| 6,082,558 A * | 7/2000 | Battaglia ................. A47F 1/126 211/59.3 |
| 6,102,192 A | 8/2000 | Tomuro et al. |
| 6,105,791 A | 8/2000 | Chaison et al. |
| 6,109,458 A | 8/2000 | Walsh et al. |
| 6,129,218 A | 10/2000 | Henry et al. |
| 6,131,748 A | 10/2000 | Kawasaki et al. |
| 6,133,830 A | 10/2000 | D'Angelo et al. |
| 6,158,598 A | 12/2000 | Josefsson |
| 6,269,285 B1 | 7/2001 | Mignault |
| 6,279,256 B1 | 8/2001 | Norolof et al. |
| 6,286,690 B1 | 9/2001 | Thalenfeld |
| 6,373,381 B2 | 4/2002 | Wu |
| 6,409,028 B2 | 6/2002 | Nickerson |
| 6,474,478 B1 | 11/2002 | Huehner et al. |
| 6,517,000 B1 | 2/2003 | McAllister et al. |
| D472,331 S | 3/2003 | Zadak |
| 6,539,280 B1 | 3/2003 | Valiulis et al. |
| D480,231 S | 10/2003 | Valiulis et al. |
| 6,659,291 B2 | 12/2003 | Huehner et al. |
| 6,690,411 B2 | 2/2004 | Naidoo et al. |
| 6,769,552 B1 | 8/2004 | Thalenfeld |
| 6,820,754 B2 | 11/2004 | Ondrasik |
| 6,826,009 B1 | 11/2004 | Hardy |
| 6,874,684 B1 | 4/2005 | Denenberg et al. |
| 6,886,699 B2 | 5/2005 | Johnson et al. |
| 6,889,854 B2 | 5/2005 | Burke |
| 6,923,330 B1 | 8/2005 | Nagel |
| 6,964,235 B2 | 11/2005 | Hardy |
| 6,967,578 B1 | 11/2005 | Guida |
| 7,007,810 B2 | 3/2006 | Huehner et al. |
| 7,059,518 B2 | 6/2006 | Forster |
| 7,202,784 B1 | 4/2007 | Herwig |
| 7,293,663 B2 | 11/2007 | Lavery, Jr. |
| 7,347,335 B2 | 3/2008 | Rankin, VI et al. |
| 7,395,938 B2 | 7/2008 | Merit et al. |
| 7,530,188 B2 | 5/2009 | Beilenhoff et al. |
| 7,533,784 B2 | 5/2009 | Vlastakis et al. |
| 7,566,037 B2 | 7/2009 | Vogler |
| 7,584,930 B2 | 9/2009 | Zich |
| 7,591,422 B2 | 9/2009 | Maitin |
| 7,671,741 B2 | 3/2010 | Lax et al. |
| 7,749,121 B2 | 7/2010 | Perng |
| 7,768,399 B2 | 8/2010 | Hachmann et al. |
| 7,792,711 B2 | 9/2010 | Swafford, Jr. et al. |
| 7,905,364 B2 | 3/2011 | Pail |
| 7,969,305 B2 | 6/2011 | Belden, Jr. et al. |
| 8,016,128 B2 | 9/2011 | Valiulis et al. |
| 8,069,994 B2 | 12/2011 | Barkdoll |
| 8,190,289 B2 * | 5/2012 | Lockwood .............. G07F 17/10 221/3 |
| 8,240,486 B2 | 8/2012 | Niederhuefner et al. |
| 8,260,456 B2 | 9/2012 | Siegel et al. |
| 8,274,391 B2 | 9/2012 | Yang |
| 8,276,766 B2 | 10/2012 | Rataiczak, III et al. |
| 8,328,027 B2 | 12/2012 | Barkdoll |
| 8,360,253 B2 | 1/2013 | Hardy |
| 8,378,826 B2 | 2/2013 | Mercier et al. |
| 8,386,075 B2 * | 2/2013 | Lockwood .............. G07F 17/10 221/152 |
| 8,443,988 B2 | 5/2013 | Niederhuefner |
| 8,534,469 B2 | 9/2013 | Northrup, Jr. et al. |
| 8,629,772 B2 | 1/2014 | Valiulis et al. |
| 8,720,702 B2 | 5/2014 | Nagel |
| 8,803,687 B2 | 8/2014 | Valiulis et al. |
| 8,812,378 B2 * | 8/2014 | Swafford, Jr. .......... G07F 11/38 705/28 |
| 8,823,521 B2 * | 9/2014 | Overhultz ............... G07F 9/026 340/568.1 |
| 8,884,761 B2 | 11/2014 | Valiulis |
| 8,941,495 B2 * | 1/2015 | Wiese .................... G08B 13/08 340/568.8 |
| 9,129,494 B2 | 9/2015 | Valiulis et al. |
| 9,241,583 B2 | 1/2016 | Nagel |
| 9,254,049 B2 | 2/2016 | Nagel |
| 9,318,007 B2 | 4/2016 | Valiulis et al. |
| 9,318,008 B2 | 4/2016 | Valiulis et al. |

(56) References Cited

U.S. PATENT DOCUMENTS

| | | | |
|---|---|---|---|
| 9,324,220 B2 | 4/2016 | Valiulis | |
| 9,483,896 B2 | 11/2016 | Lockwood et al. | |
| 9,495,856 B2 | 11/2016 | Brenner | |
| 9,576,417 B2 | 2/2017 | Christianson | |
| 9,805,334 B2 | 10/2017 | Overhultz et al. | |
| 9,805,539 B2 | 10/2017 | Swafford, Jr. et al. | |
| 10,121,341 B2 | 11/2018 | Ewing et al. | |
| 10,271,666 B2 | 4/2019 | Taylor et al. | |
| 10,535,216 B2 | 1/2020 | Swafford, Jr. et al. | |
| 10,720,035 B2 | 7/2020 | Ewing et al. | |
| 10,885,753 B2 | 1/2021 | Ewing et al. | |
| 11,412,863 B2 * | 8/2022 | Grant | A47F 1/126 |
| 2001/0002210 A1 | 5/2001 | Petite | |
| 2001/0004239 A1 | 6/2001 | Irizarry et al. | |
| 2001/0044751 A1 | 11/2001 | Pugliese, III et al. | |
| 2002/0004690 A1 | 1/2002 | Paulucci et al. | |
| 2002/0067259 A1 | 6/2002 | Fufidio et al. | |
| 2002/0108916 A1 | 8/2002 | Nickerson | |
| 2002/0130776 A1 | 9/2002 | Houde | |
| 2003/0004784 A1 | 1/2003 | Li et al. | |
| 2003/0029816 A1 | 2/2003 | Huehner et al. | |
| 2003/0030548 A1 | 2/2003 | Kovacs et al. | |
| 2003/0057167 A1 * | 3/2003 | Johnson | A47F 1/126 |
| | | | 211/59.3 |
| 2003/0175004 A1 | 9/2003 | Garito et al. | |
| 2003/0227382 A1 | 12/2003 | Breed | |
| 2004/0034581 A1 | 2/2004 | Hill et al. | |
| 2004/0053044 A1 | 3/2004 | Moreno et al. | |
| 2004/0073334 A1 | 4/2004 | Terranova | |
| 2004/0084386 A1 | 5/2004 | Huehner et al. | |
| 2004/0124201 A1 | 7/2004 | Hieb | |
| 2004/0145477 A1 | 7/2004 | Easter et al. | |
| 2004/0195319 A1 | 10/2004 | Forster | |
| 2005/0040123 A1 | 2/2005 | Ali | |
| 2005/0056602 A1 | 3/2005 | Hardy | |
| 2005/0098626 A1 | 5/2005 | Jordan et al. | |
| 2005/0104733 A1 | 5/2005 | Campero | |
| 2005/0161420 A1 | 7/2005 | Hardy et al. | |
| 2005/0168345 A1 * | 8/2005 | Swafford | G08B 13/19697 |
| | | | 340/686.1 |
| 2005/0189309 A1 | 9/2005 | Hardy | |
| 2005/0189369 A1 | 9/2005 | Vlastakis et al. | |
| 2005/0279722 A1 * | 12/2005 | Ali | A47F 10/00 |
| | | | 211/59.3 |
| 2005/0288708 A1 | 12/2005 | Kammerer et al. | |
| 2006/0049122 A1 | 3/2006 | Mueller et al. | |
| 2006/0068144 A1 | 3/2006 | Mizuno et al. | |
| 2006/0163180 A1 | 7/2006 | Rankin, VI et al. | |
| 2006/0163272 A1 * | 7/2006 | Gamble | A47F 1/126 |
| | | | 221/227 |
| 2006/0198611 A1 | 9/2006 | Park | |
| 2006/0219517 A1 | 10/2006 | Cheng et al. | |
| 2006/0226095 A1 | 10/2006 | Hardy | |
| 2007/0050271 A1 | 3/2007 | Ufford et al. | |
| 2007/0095903 A1 | 5/2007 | Suenbuel | |
| 2007/0108142 A1 | 5/2007 | Medcalf et al. | |
| 2007/0251900 A1 * | 11/2007 | Hardy | A47F 1/126 |
| | | | 211/59.3 |
| 2007/0267364 A1 | 11/2007 | Barkdoll | |
| 2007/0267367 A1 | 11/2007 | Mueller et al. | |
| 2007/0273513 A1 | 11/2007 | White | |
| 2008/0015956 A1 | 1/2008 | Regard | |
| 2008/0203253 A1 | 8/2008 | Vogler | |
| 2008/0307687 A1 | 12/2008 | Nagel et al. | |
| 2008/0309489 A1 | 12/2008 | Hachmann et al. | |
| 2009/0006196 A1 | 1/2009 | Barkan et al. | |
| 2009/0091448 A1 | 4/2009 | Leyden et al. | |
| 2009/0095695 A1 | 4/2009 | Moock et al. | |
| 2009/0101606 A1 | 4/2009 | Olson | |
| 2009/0109027 A1 | 4/2009 | Schuller | |
| 2009/0174566 A1 | 7/2009 | Volk et al. | |
| 2009/0248198 A1 * | 10/2009 | Siegel | G06Q 10/08 |
| | | | 700/231 |
| 2010/0012602 A1 * | 1/2010 | Valiulis | A47F 1/126 |
| | | | 211/59.3 |
| 2010/0013603 A1 | 1/2010 | Chatani et al. | |
| 2010/0017025 A1 * | 1/2010 | Lockwood | G07F 9/002 |
| | | | 700/240 |
| 2010/0097223 A1 | 4/2010 | Kruest et al. | |
| 2010/0175438 A1 | 7/2010 | Sankey | |
| 2010/0200526 A1 | 8/2010 | Barkdoll | |
| 2010/0237093 A1 * | 9/2010 | Lockwood | G07F 11/42 |
| | | | 221/279 |
| 2010/0238031 A1 | 9/2010 | Belden, Jr. et al. | |
| 2010/0268792 A1 | 10/2010 | Butler et al. | |
| 2011/0055103 A1 * | 3/2011 | Swafford, Jr. | G07F 9/026 |
| | | | 705/345 |
| 2011/0094975 A1 * | 4/2011 | Hardy | A47F 5/0068 |
| | | | 211/4 |
| 2011/0168652 A1 | 7/2011 | Barkdoll | |
| 2011/0215060 A1 | 9/2011 | Niederhuefner | |
| 2011/0218889 A1 * | 9/2011 | Westberg | G06Q 10/087 |
| | | | 705/28 |
| 2011/0227735 A1 | 9/2011 | Fawcett et al. | |
| 2011/0282768 A1 | 11/2011 | Swafford, Jr. et al. | |
| 2011/0284571 A1 * | 11/2011 | Lockwood | G07F 9/002 |
| | | | 221/151 |
| 2012/0006764 A1 | 1/2012 | Hachmann et al. | |
| 2012/0091162 A1 * | 4/2012 | Overhultz | G06Q 10/087 |
| | | | 221/6 |
| 2012/0209426 A1 * | 8/2012 | Lockwood | G07F 17/10 |
| | | | 700/240 |
| 2012/0253508 A1 | 10/2012 | Holmes | |
| 2012/0293330 A1 | 11/2012 | Grant et al. | |
| 2013/0002422 A1 * | 1/2013 | Wiese | G08B 13/08 |
| | | | 340/539.1 |
| 2013/0024023 A1 * | 1/2013 | Siegel | A47F 1/126 |
| | | | 700/244 |
| 2013/0106259 A1 | 5/2013 | Lockwood et al. | |
| 2013/0141240 A1 | 6/2013 | Valiulis et al. | |
| 2013/0142494 A1 | 6/2013 | Valiulis et al. | |
| 2013/0144433 A1 * | 6/2013 | Lockwood | G07F 9/002 |
| | | | 700/236 |
| 2013/0247834 A1 | 9/2013 | Kodat | |
| 2013/0312644 A1 | 11/2013 | Copeland | |
| 2014/0055264 A1 | 2/2014 | Valiulis et al. | |
| 2014/0055266 A1 | 2/2014 | Valiulis | |
| 2014/0070948 A1 | 3/2014 | Valiulis et al. | |
| 2014/0197953 A1 | 7/2014 | Valiulis et al. | |
| 2014/0352372 A1 | 12/2014 | Grant et al. | |
| 2015/0068991 A1 * | 3/2015 | Kostka | A47F 1/126 |
| | | | 211/59.3 |
| 2015/0238026 A1 * | 8/2015 | Chambers | A47F 5/005 |
| | | | 211/59.3 |
| 2015/0321827 A1 | 11/2015 | Lockwood et al. | |
| 2015/0371482 A1 | 12/2015 | Szpak et al. | |
| 2017/0202369 A1 * | 7/2017 | Mercier | A47F 5/083 |
| 2017/0303704 A1 * | 10/2017 | Taylor | G07F 9/026 |
| 2018/0047243 A1 | 2/2018 | Swafford, Jr. et al. | |
| 2019/0019140 A1 * | 1/2019 | Costello | G09F 3/208 |
| 2019/0183259 A1 * | 6/2019 | Grant | A47F 1/126 |
| 2019/0290020 A1 | 9/2019 | Ewing et al. | |
| 2019/0374048 A1 | 12/2019 | Valiulis et al. | |
| 2020/0315371 A1 * | 10/2020 | Ewing | G07F 11/22 |

FOREIGN PATENT DOCUMENTS

| | | |
|---|---|---|
| EP | 0868871 A1 | 10/1998 |
| EP | 1256296 A2 | 11/2002 |
| EP | 1541064 A1 | 6/2005 |
| EP | 1541064 B1 | 2/2006 |
| EP | 2888723 A1 | 7/2015 |
| EP | 2988281 A1 | 2/2016 |
| GB | 2304102 A | 3/1997 |
| GB | 2360514 A | 9/2001 |
| KR | 100823026 B1 | 4/2008 |
| KR | 20100137956 A | 12/2010 |
| KR | 20110002261 U | 3/2011 |
| KR | 20110043837 A | 4/2011 |
| KR | 20110080411 A | 7/2011 |
| NL | 1001794 C2 | 6/1997 |

(56) References Cited

FOREIGN PATENT DOCUMENTS

| WO | WO 9103967 A1 | 4/1991 |
|----|---------------|--------|
| WO | WO 9740724 A1 | 11/1997 |
| WO | WO 9927824 A1 | 6/1999 |
| WO | WO 0181988 A2 | 11/2001 |
| WO | WO 2004/083051 A2 | 9/2004 |
| WO | WO 2005/107535 A1 | 11/2005 |
| WO | WO 2011/025085 A1 | 3/2011 |
| WO | WO 2012/127849 A1 | 9/2012 |
| WO | WO 2018/045038 A1 | 3/2018 |

OTHER PUBLICATIONS

POS Tuning—für mehr Erfolg am Point of Sale: POS T-Product Pusher; http://www.postuning.de/69.0.html?L=2; website; Mar. 29, 2006; 1 page.

POS Tuning—für mehr Erfolg am Point of Sale: The POS T-Systemtray; http://ww.postuning.de/68.0.hyml?L=2; website; Mar. 29, 2006; 1 page.

Indyme smartresponse; 2 pages printed from internet http://www.indyme.com/; date last visited Apr. 8, 2013.

\* cited by examiner

ANTI-THEFT PUSHER WITH INCREMENTAL DISTANCE DETECTION

CROSS-REFERENCE TO RELATED PATENT APPLICATIONS

This patent application is a continuation of the co-pending U.S. patent application Ser. No. 16/839,667 filed Apr. 3, 2020, which claims the benefit of U.S. Provisional Patent Application No. 62/830,045, filed Apr. 5, 2019, the entire teachings and disclosures of which are incorporated herein by reference thereto.

FIELD OF THE INVENTION

This invention generally relates to a retail merchandise pusher, and more particularly to a self-facing retail merchandise pusher incorporating anti-theft and inventory management technologies.

BACKGROUND OF THE INVENTION

Self-facing retail merchandise displays are generally known in the art. Once such typical display includes one or more pusher assemblies which may for example be situated on a retail merchandise shelf. A conventional pusher assembly incorporates a pusher that rides along an elongated track. The track may be a single drop in track with a single pusher slidable thereon, or it may be a structure defining multiple tracks for receipt of respective pushers. A spring is connected between the pusher and a leading edge of the track. The spring acts to bias the pusher forward along the track towards the leading edge thereof. A given display may utilize multiple pusher assemblies arranged generally in parallel to on another.

A user can retract the pusher away from the leading edge of the track and position items of retail merchandise (also referred to herein as products) in a linear row on top of the track and uncoiled portion of the spring, between the leading edge of the track and the pusher. The biasing force provided by the spring and exerted upon the pusher serves to bias the linear row of retail merchandise forward to ultimately "front face" the merchandise.

That is, when a customer removes the leading most item of merchandise from the linear row of merchandise, the pusher will be drawn forward by the spring to index the row of merchandise forward so that the next item of merchandise in the row is positioned proximate the leading edge of the track in an aesthetically pleasing manner. Such automatic front facing eliminates the necessity for retail store employees to manually face the merchandise, and thus ultimately reduces the cost of labor of the retailer.

The aforementioned pusher systems have been utilized in various retail display environments. One example is a retail shelf. Typically, a plurality of pusher bodies and their corresponding tracks are arranged in a side-by-side manner along the shelf. Each pusher and its corresponding track are separated by dividers to maintain a plurality of generally straight rows of merchandise that run from the front to the back of the shelf. Such a familiar configuration can be found in many retail stores for selling hygiene items such as deodorant, as one example.

In another configuration, the pusher system may be embodied as a stand-alone pusher tray. These trays may include means for mounting the tray as a cantilevered extension from another structure, such as a bar. These trays may also be situated directly on a retail shelf. Further, these trays may include side barriers which are adjustable so as to accommodate merchandise of differing widths. Examples of these trays may be readily seen at U.S. Pat. Nos. 9,254,049, 9,241,583, 8,720,702, each of which is incorporated by reference herein in its entirety.

Loss prevention is a continuing problem in the retail industry. Current anti-theft systems involve locking up merchandise behind counters that are far away from other related merchandise, or locking up the merchandise in secure cabinets that are closer to where the related merchandise is generally stored.

Heretofore, there have been limited attempts at incorporating anti-theft technology into pusher systems themselves. Such attempts, while sufficient for a majority of loss prevention scenarios may not detect very small movements of the pusher, e.g., where very small merchandise is contained in the pusher system such that removal of one item or even several creates a very small movement in the pusher.

Other challenges arise in self-facing retail merchandise displays with regard to inventory management. Because the merchandise contained in such displays is typically high purchase volume merchandise, e.g., deodorants, razor blades, medicines, etc., it is not uncommon for one or more rows of the display to become completely empty for some time before being restocked. Accordingly, such displays must be routinely inspected by store personnel to ensure that they have adequate stock levels. This inspection may be overlooked from time to time in the event the store is understaffed, or adequately staffed but very busy. Such manual inspection, while necessary, diverts store personnel from other potentially more pressing activities such as customer service.

Accordingly, there exists a need in the art for a retail merchandise pusher display, pusher assembly, and pusher incorporating a system for retail stores that will deter theft and enhance inventory management of such displays.

BRIEF SUMMARY OF THE INVENTION

In one aspect, embodiments of the invention provide a retail merchandise pusher configured for sliding along a track of a pusher assembly, where the pusher assembly is mountable to a retail merchandise shelf. The pusher includes a housing, a spring drum rotatably mounted within the housing, and a coil spring mounted to the spring drum. The coil spring is coilable and uncoilable upon rotation of the spring drum. A controller is coupled to a sensor arrangement carried within the housing. The sensor arrangement includes a spring drum sensor for detecting rotation of the spring drum. A direction sensor detects a direction of rotation of the spring drum, while an incremental distance sensor detects an incremental movement of the pusher. The controller is configured to calculate, based on data from the sensor arrangement, a total distance and direction of travel by the pusher, and also configured to generate an alarm when the pusher travels more than a threshold distance within a predetermined period of time.

In a particular embodiment, the alarm is at least one of a visual, audible, or RF signal. The controller may be coupled to an output device disposed in the housing, where the output device is configured to produce the alarm as a visual or audible signal. Furthermore, the controller may be coupled to a transmitter disposed in the housing, where the transmitter is configured to wirelessly transmit data to a remote receiver. The aforementioned data includes at least one of an alarm status, and the total distance and direction of travel by the pusher.

In particular embodiments, the controller is configured to transmit information, based on data from the sensor arrangement, wherein the information includes an inventory status for the pusher assembly. As used in this application, the term "inventory status" or "stock status" relates to the number of merchandise items remaining in a particular pusher assembly. The movement of the pusher, which may indicate either the replenishment or the removal of goods from the pusher assembly, typically results in a change of the inventory status for the pusher assembly. In more particular embodiments, the controller comprises a microprocessor.

In some embodiments, the spring drum sensor includes a pair of opposed electrical contacts and a tab extending from the spring drum, the tab rotatable with the spring drum, wherein the tab is arranged to bias one of the pair of opposed electrical contacts into contact with the other one of the pair of the opposed electrical contacts at each complete revolution of the spring drum.

In other embodiments, the direction sensor includes a first electrical contact, a common electrical contact, and a second electrical contact, the common electrical contact interposed between the first electrical contact and the second electrical contact. In a further embodiment, a distal end of common electrical contact is intermittently in contact with gear teeth formed on an outer periphery of the spring drum such that the common electrical contact is biased by the gear teeth into contact with the first electrical contact when the spring drum rotates in a first direction, and biased by the gear teeth into contact with the second electrical contact when the spring drum rotates in a second rotational direction opposite the first rotational direction.

In certain embodiments, the incremental distance sensor includes a sensing gear in contact with the spring drum, and a slotted disc mounted to the sensing gear, the incremental distance sensor further comprising a light sensor arrangement configured to produce and detect a beam of light. In a further embodiment, a peripheral region of the slotted disc is movable through a sensing region through which the beam of light extends, wherein the peripheral region includes a plurality of slots formed therein, wherein the plurality of slots sequentially pass through the sensing region as the sensing gear rotates such that the beam of light alternately passes through and is blocked by the plurality of slots. The light sensor arrangement may include a light emitter located on a first side of the slotted disc, and a light sensor located on a second side of the slotted disc opposite the first side, the light sensor arranged to detect the beam of light emitted by the light emitter.

In more particular embodiments, the light emitter is arranged to emit the beam of light such that it is perpendicular to a plane of rotation defined by the slotted disc. In other embodiments, the coil spring is configured to bias the housing toward one end of the track. Further, the pusher may be configured to permit a user to set or adjust at least one of the threshold distance and the predetermined period of time. In some embodiments, the pusher includes a reset control to set a zero position for the controller, the zero position indicating that no merchandise is contained in the pusher assembly such that the pusher is at an end of the track.

In another aspect, embodiments of the invention provide a pusher assembly configured for mounting to a retail shelf, the shelf having a front and a back, wherein retail merchandise situated near the front of the shelf is removable from the pusher assembly. The pusher assembly includes a track, and a pusher mounted to the track. The pusher is slidable toward and away from the front of the shelf. The pusher includes a controller coupled to a sensor arrangement for detecting movement and a direction of travel by the pusher. The controller is configured to calculate, based on data from the sensor arrangement, a total distance traveled by the pusher along the track. The controller is further configured to generate an alarm when the pusher travels more than a threshold distance within a predetermined period of time.

In a particular embodiment, the sensor arrangement includes a spring drum sensor, a direction sensor, and an incremental distance sensor. In one embodiment, the spring drum sensor includes a pair of opposed electrical contacts and a tab extending from a rotatable spring drum of the pusher, the tab rotatable with the spring drum, wherein the tab is arranged to bias one of the pair of opposed electrical contacts into contact with the other one of the pair of the opposed electrical contacts at each complete revolution of the spring drum.

In another embodiment, the direction sensor includes a first electrical contact, a common electrical contact, and a second electrical contact, the common electrical contact interposed between the first electrical contact and the second electrical contact. The incremental distance sensor may include a sensing gear in contact with the spring drum the gear including a slotted disc mounted to the gear, the incremental distance sensor further comprising a light sensor arrangement configured to produce and detect a beam of light.

In certain embodiments, the alarm is at least one of a visual, audible, or RF signal, and the controller is coupled to a transmitter configured to wirelessly transmit data to a remote receiver. The aforementioned data includes at least one of an alarm status, and the total distance and direction of travel by the pusher. The pusher may be further configured to permit a user to set or adjust at least one of the threshold distance and the predetermined period of time, and to include a reset control to set a zero position for the controller. The zero position indicates that no merchandise is contained in the pusher assembly such that the pusher is at an end of the track. The controller may be configured to provide, based on data from the sensor arrangement, an inventory status of the pusher assembly.

In yet another aspect, embodiments of the invention provide a retail merchandise display system for self-facing retail merchandise. The retail merchandise display includes a shelf, and at least one pusher assembly mounted to the shelf. The at least one pusher assembly includes a track, and a pusher slidable along the track. The pusher assembly includes a controller coupled to a sensor arrangement. The controller is configured to calculate, based on data from the sensor arrangement, a large-scale movement of the pusher, and an incremental movement by the pusher, where the controller is configured to generate a local alarm when a total distance traveled by the pusher, where the total distance is equal to a sum of the large-scale movement and the incremental movement, is greater or equal to a predefined distance. The pusher includes a transmitter operable to wirelessly communicate the total distance traveled by the pusher. A receiver is remotely located from the pusher, and configured to receive a wireless signal from the transmitter, and configured to generate a remote alarm in concert with the local alarm.

In certain embodiments, the local and remote alarms are at least one of visual or audible alarms. In other embodiments, the at least one pusher assembly includes a plurality of pusher assemblies, wherein each one of the plurality of pusher assemblies wirelessly communicate with the receiver. Still, in other embodiments, the receiver includes an RF receiver, an audio speaker, and a Wi-Fi module configured to transmit data received from the pusher. Further, the wireless signal may be an RF signal.

In some embodiments, the sensor arrangement includes a spring drum sensor, a direction sensor, and an incremental distance sensor. Further, the receiver may be configured to transmit data received from the pusher to a computer or mobile device, such that the data allows the computer or mobile device to display information regarding the pusher assembly. Moreover, the information regarding the pusher assembly may include at least one of an alarm status, and inventory status, and a position of the pusher.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, the same illustrate an exemplary embodiment of a retail merchandise display system that incorporates a pusher assembly. The pusher assembly includes a pusher which includes a new and inventive sensor arrangement for detecting and calculating relatively small movements of the pusher. Such a configuration is highly advantageous for loss prevention and inventory management purposes, particularly loss prevention and inventory management of relatively small products.

Indeed, the high resolution of the distance detection of the pusher enables an accurate calculation of a number of products removed from the retail merchandise display in a single movement cycle or in a given period of time. For example, a movement cycle (i.e., a continuous movement of the pusher) reflecting a relatively long distance traveled by the pusher is indicative of a number of products removed in a single movement of the pusher. As another example, a large number of separate movement cycles during a relatively short period of time is also indicative of a number of products removed from the display. In either case, each is indicative of a potential theft event. The system described herein is operable to generate one or both of a local and a remote alarm when such potential theft conditions are met. Further, the system described herein also communicates the information it collects regarding pusher movement for purposes of managing the inventory of that particular pusher assembly.

Figure 1:
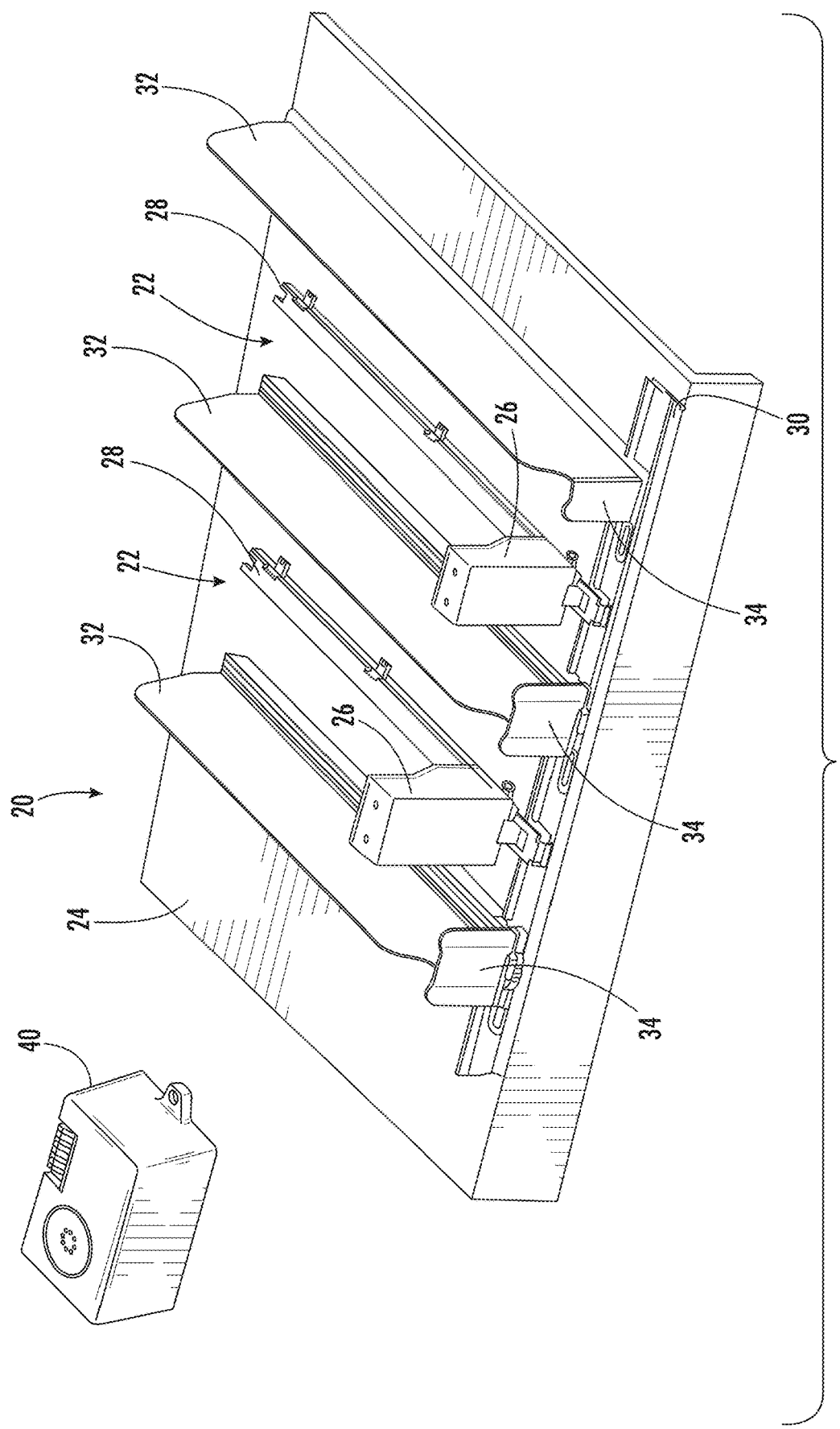
FIG. 1 is a perspective view on exemplary embodiment of a retail merchandise display system that incorporates a pusher assembly constructed in accordance with an embodiment of the invention.

With particular reference to FIG. 1, the same illustrates an exemplary embodiment of a retail merchandise display system 20 (also referred to herein as display 20). Display 20 included one or more pusher assemblies 22 mounted to a shelf 24. Each pusher assembly 22 includes a pusher 26 that is slidable along a track 28. Each pusher 26 houses a coil spring described below which attaches to shelf 24 directly, or as shown in the illustrated embodiment, to an external structure that in turn is mounted to shelf 24 such as a mounting rail 30. The pusher 26 is biased by this coil spring 80 toward one end of the track 28. In the embodiment shown, the pusher 26 is biased by this coil spring 80 toward the mounting rail 30, i.e., from the back of shelf 24 toward the front of shelf 24.

As described in greater detail below, pusher 26 houses a sensor arrangement which is operable to calculate the distance traveled by pusher 26 along track 28, and to determine the direction of such travel, e.g., from the back to the front of shelf 24, or from the front to the back of shelf 24. In event that such movement is indicative of a potential theft event, pusher 26 is also operable to generate a local alarm at pusher 26, and/or a remote alarm at a receiver 40 of display 20 located remotely from the remainder of display 20. The term "alarm" as used herein should be taken to mean any audible or visual cue designed to draw attention to display 20, such as beeps, tones, prerecorded messages, flashing or continuous lights, etc., but is also intended to include any electronic signal which could be used to serve as a warning. Such remote alarm functionality is particularly advantageous as receiver 40 may be located with security or other personnel that can readily respond to a potential theft event. The remote alarm generated by receiver 40 may be simultaneous and in concert with the local alarm generated by the pusher 26.

Still referring to FIG. 1, two pusher assemblies 22 are illustrated. However, display 20 may utilize fewer or greater pusher assemblies. Indeed, in the case of smaller products, a relatively large number of pusher assemblies 22 may be situated on shelf 24. Further, display 20 may optionally also include a plurality of dividers 32 as shown, for keeping adjacent rows of product confined from one another. Each divider 32 may also include its own integrated front stop 34 as shown, for stopping the forward motion of products as they are biased by pusher 26. Alternatively, a front stop may be mounted directly to shelf 24 (or be formed by the shelf itself) or alternatively to mounting rail 30. With the foregoing description in hand, it will be readily recognized that mounting rail 30, dividers 32, and front stops 34 are optional components that may take on different forms or may be omitted entirely within the scope of the invention described herein.

Figure 2:
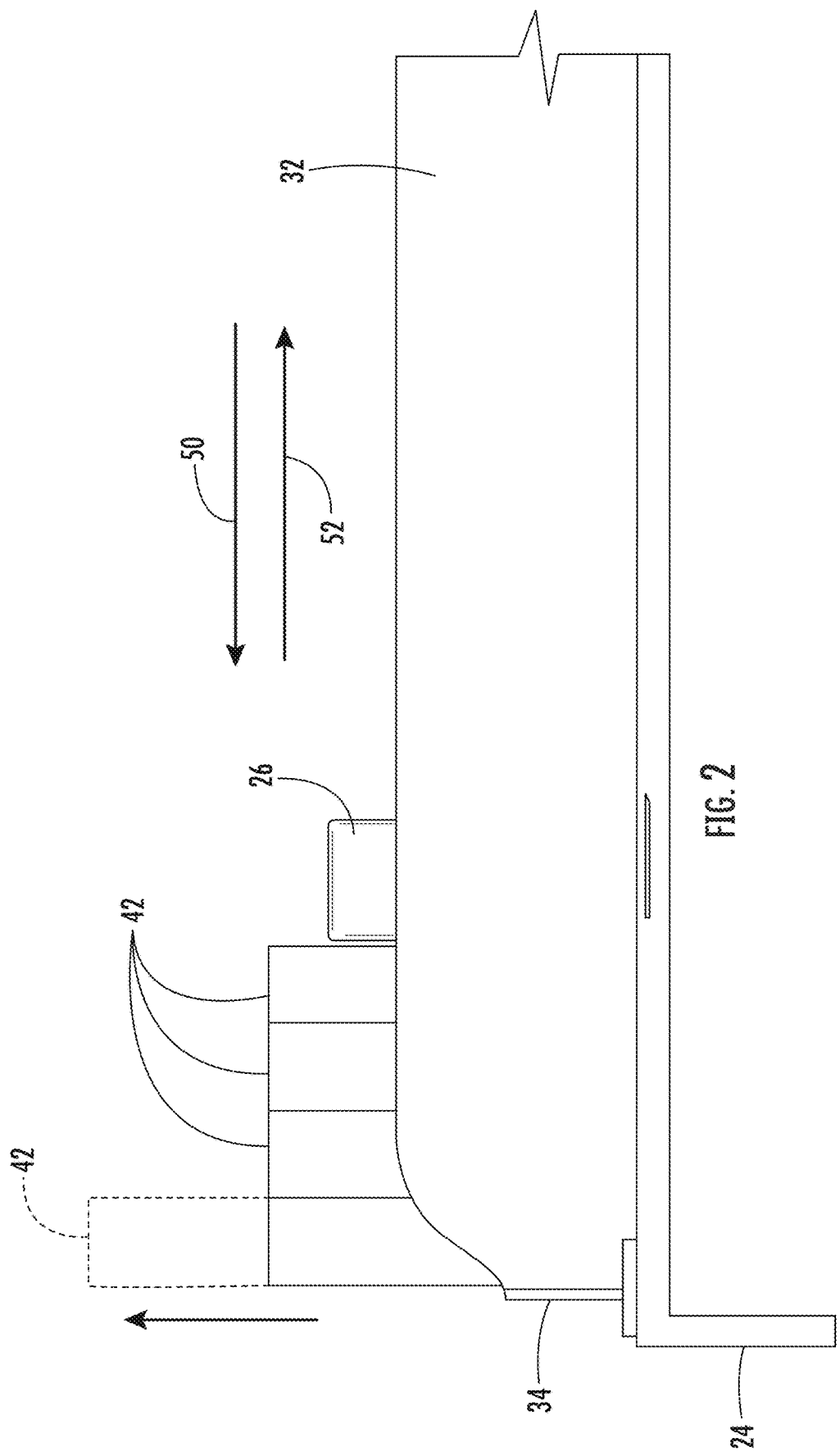
FIG. 2 is a side view of the retail merchandise display system of FIG. 1.

Turning now to FIG. 2, pusher assembly 22, and particularly pusher 26, is operable to bias products 42 forward, i.e., in direction 50 shown in FIG. 2. The leading product 42 is removable from display 20 as shown. In a potential theft event, multiple or even all of products 42 may be removed in a single action, or in multiple quick successive actions. In either case, pusher 26 will move a relatively large distance forward in direction 50. As introduced above and described below, pusher 26 is operable to determine the distance it has traveled, and generate an appropriate alarm when the distance is beyond a predetermine threshold. As discussed herein, the alarm may be a visual alarm, audible alarm, or electronic signal such as a wireless or RF signal which could serve as a warning to the system user. Further, the alarm may be any combination or all of the aforementioned types.

Figure 3:
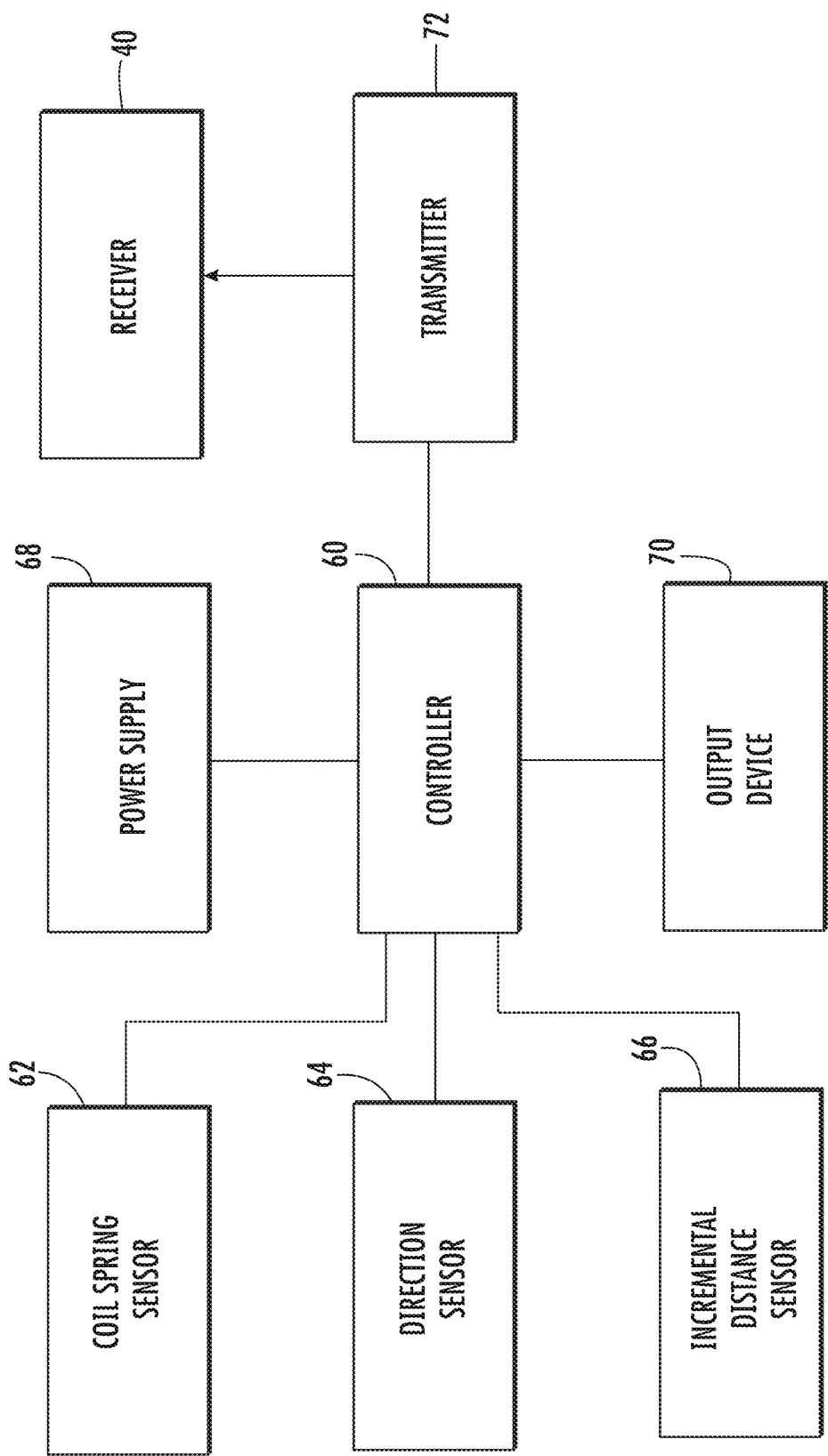
FIG. 3 is a schematic illustration of the operational topology of the retail merchandise display system, according to an embodiment of the invention.

With reference to FIG. 3, pusher 26 incorporates a new and inventive sensor arrangement for achieving the foregoing functionality. The topology shown in FIG. 3 depicts this sensor arrangement and additional componentry necessary to achieve the functionality herein. In particular, the sensor arrangement includes a spring drum sensor 62, a direction sensor 64, and an incremental distance sensor 66 which in combination determine the distance and direction traveled by pusher 26. Each of the foregoing components of the sensor arrangement is in operable communication with a controller 60. Controller 60 may for example be a microprocessor, or any other firmware, hardware, or software necessary to achieve the functionality herein.

Controller 60 is coupled to a local power supply 68 and an output device 70. Local power supply 68 provides electrical power to the controller and/or sensor arrangement to achieve the operation described herein. Output device 70 produces the above-introduced local alarm, and as such, may be embodied as any device capable of producing such an alarm. As will be explained in more detail below, the controller 60 is configured to calculate, based on data from the sensor arrangement, a total distance and direction of travel by the pusher 26, and to generate an alarm when the pusher 26 travels more than a threshold distance within a predetermined period of time. As will be explained below, the pusher 26 may include controls to allow the user to adjust the threshold distance and the predetermined period of time.

Controller 60 is also in communication with a transmitter 72 which wirelessly sends the distance and direction of travel information, alarm status, and any other information collected by controller 60 to receiver 40, shown schematically in FIG. 3. As used in this application, the term "alarm status" refers to whether or not an alarm is being triggered or has been triggered by the controller 60. This wireless communication may use any known radio frequency (RF) communication protocol. The data transmitted from the controller 60 to the receiver 40 may include at least one or all of an inventory status, alarm status, and total distance and direction of travel by the pusher 26. In at least one embodiment of the invention, there are a plurality of pusher assemblies 22, wherein each one of the plurality of pusher assemblies 22 wirelessly communicates with the receiver 40. In certain embodiments, the receiver 40 includes at least one of an RF receiver, an audio speaker, and a Wi-Fi module which is configured to wirelessly transmit data (e.g., as an RF signal) received from the pusher 26.

Figure 4:
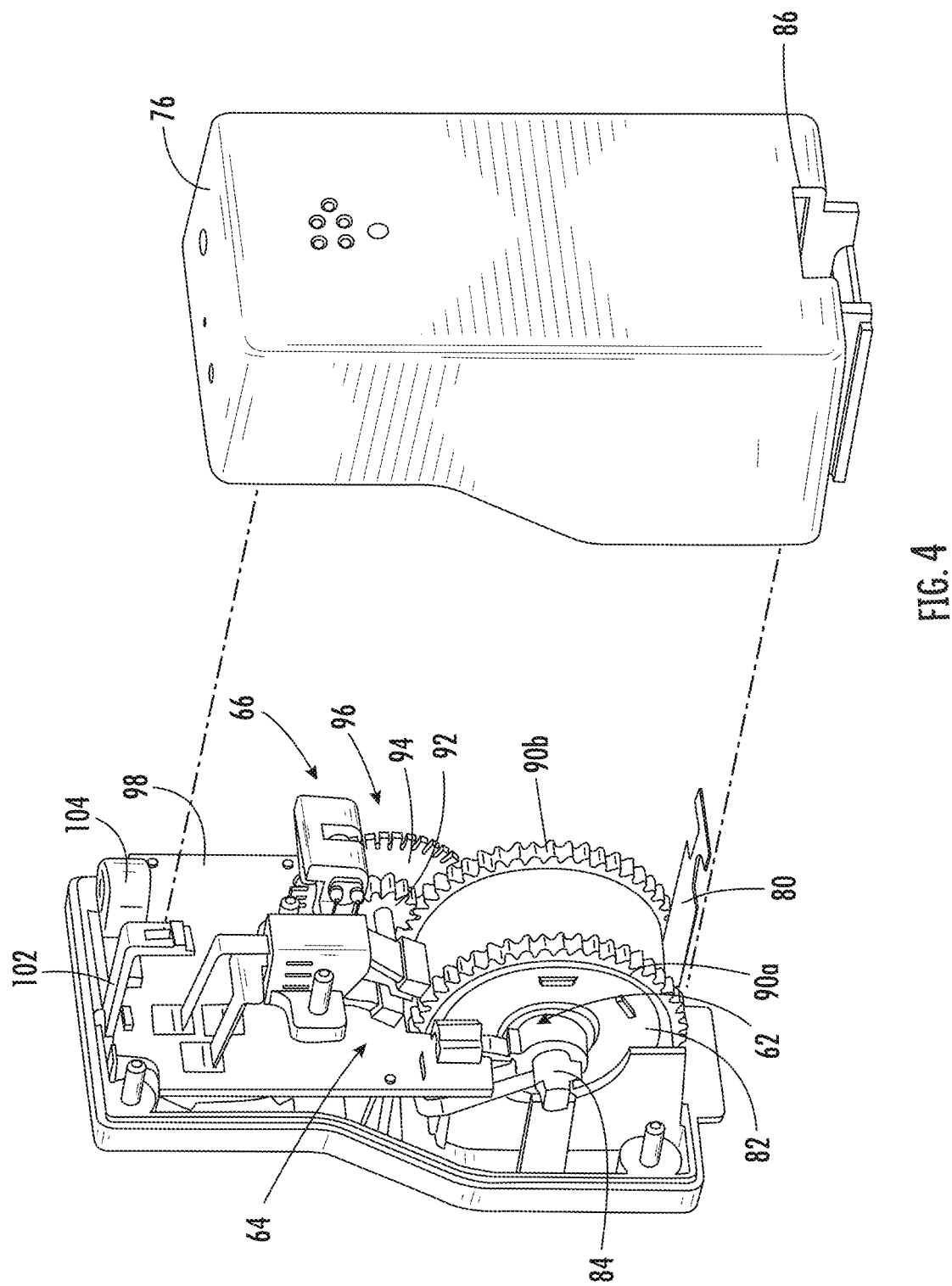
FIG. 4 is a perspective exploded view of a pusher of the pusher assembly, according to an embodiment of the invention.

Turning to FIG. 4, the same illustrates pusher 26 in a partially exploded view. Pusher 26 includes an outer housing 76 that has been partially removed to reveal the interior componentry of pusher 26. Pusher 26 carries a coil spring 80. Coil spring 80 is mounted on a spring drum 82. Spring drum 82 is rotatable about a shaft 84 to allow, in specific embodiments, an uncoiled portion of coil spring 80 to be paid out or retracted through an opening 86 formed in housing 76.

As can be seen in FIG. 4, spring drum 82 includes gear teeth 90a, 90b formed at opposed peripheral side edges of spring drum 82. Gear teeth 90a are used to repeatedly actuate a portion of direction sensor 64 as described below. Gear teeth 90b mesh with a sensing gear 92 of incremental distance sensor 66 as shown. As described in greater detail below, sensing gear 92 includes a slotted disc 94 mounted to or formed integrally with sensing gear 92.

Slotted disc 94 includes a plurality of slots 96 formed in a peripheral region thereof as shown. These slots successively block a beam of light of incremental distance sensor 66 as sensing gear 92 rotates. This action creates successive light pulses which are detected by incremental distance sensor 66 and used to measure the distance traveled by pusher 26 with a high resolution.

Each of the spring drum sensor 62, direction sensor 64, and incremental distance sensor 66 are coupled to a printed circuit board (PCB) 98 as shown to achieve the topology illustrated in FIG. 3. Additionally, a reset control 102 which may be a button, switch, or dial, and threshold distance control 104 are also coupled to PCB 98 to achieve the functionality described herein. Thus, embodiments of the pusher 26 include the reset control 102 to set a zero position for the controller 60, the zero position indicating that no merchandise is contained in the pusher assembly 22 such that the pusher 26 is at the front end of the track 28.

Figure 5:
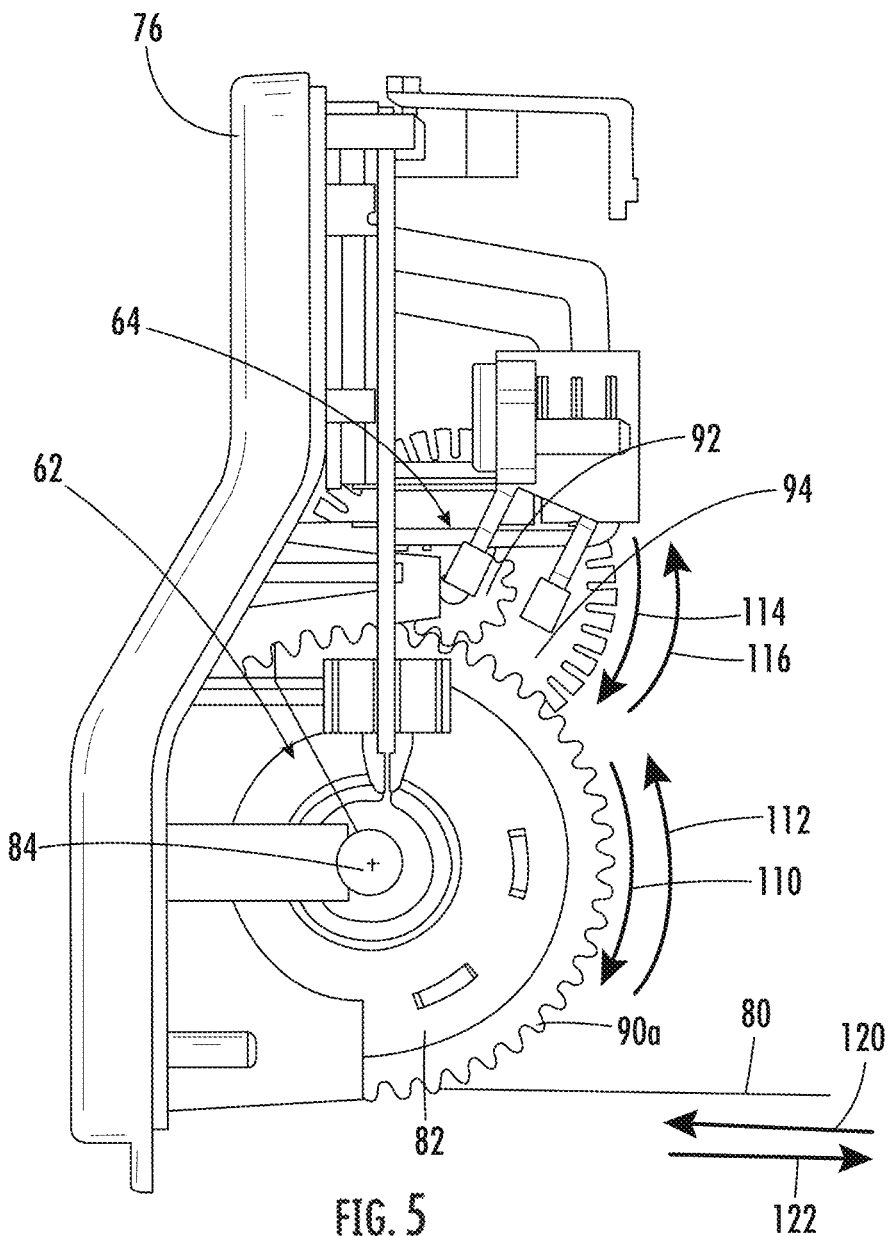
FIG. 5 is a side view of the pusher, with a portion of its outer housing removed, according to an embodiment of the invention.

With reference to FIG. 5, when a portion of coil spring 80 is uncoiled and then is recoiled onto spring drum 82 by moving in direction 120, spring drum 82 rotates in direction 110 as shown. Movement of coil spring 80 in direction 120 is indicative of pusher 26 moving toward the front of shelf 24 (see FIGS. 1, 2), i.e., is indicative to a product or products 42 being removed from display 20.

Due to the contact between spring drum 82 and sensing gear 92, this causes sensing gear 92 and its associated slotted disc 94 to rotate in direction 116 as shown. Conversely, movement of spring 80 in direction 122 causes spring drum 82 to rotate in direction 112 as shown. Movement of coil spring 80 in direction 122 is indicative to usher 26 moving toward the back of shelf 24 (see FIGS. 1, 2), i.e., is indicative of product or products 42 being restocked into display 20. This in turn causes sensing gear 92 and slotted disc 94 to rotate in direction 114.

Figure 6:
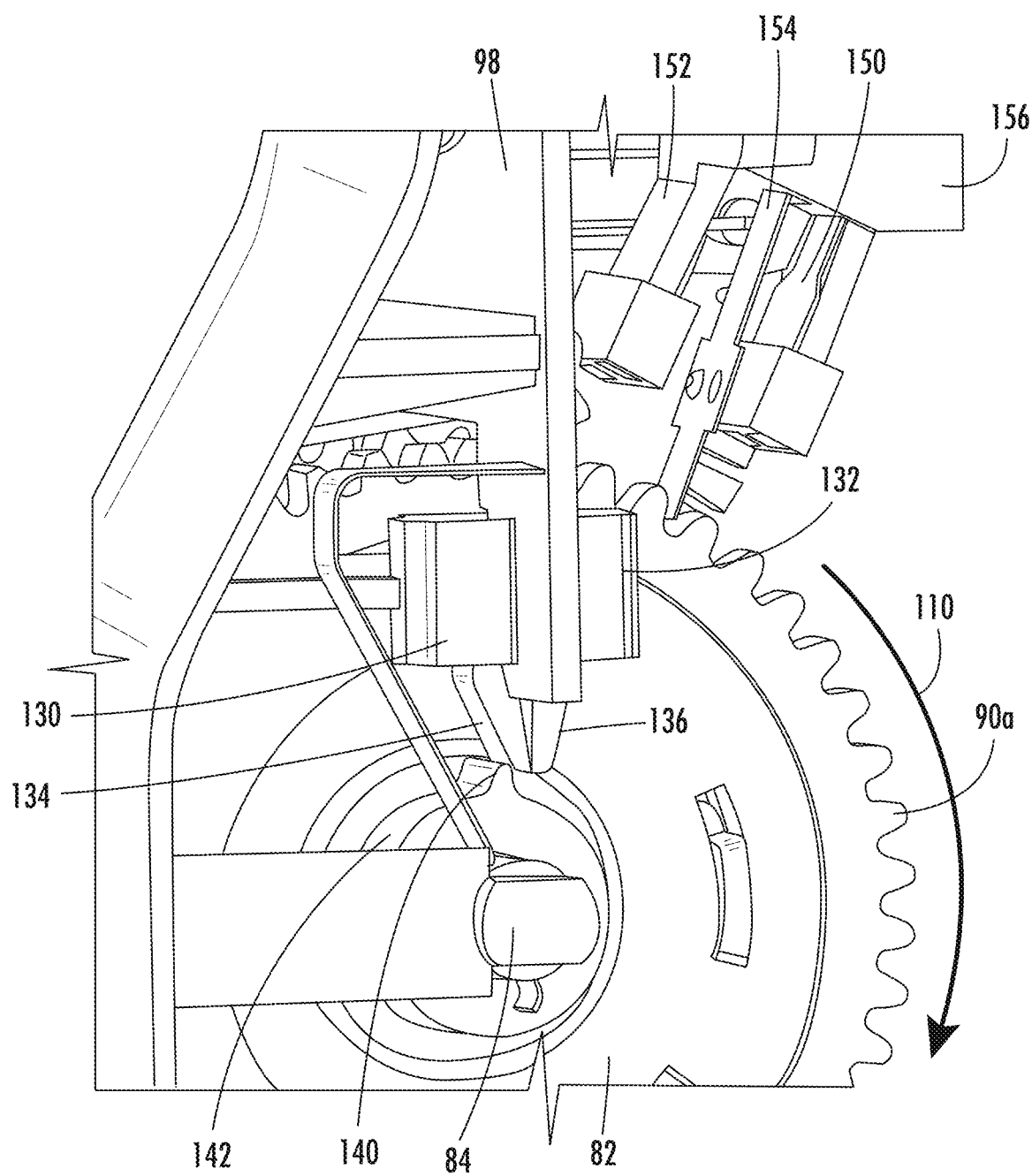
FIG. 6 is a perspective view of the pusher, with a portion of its outer housing removed, according to an embodiment of the invention.

Turning now to FIG. 6, the operation of spring drum sensor 62 and direction sensor 64 will be described in greater detail. Turning first to spring drum sensor 62, the same includes a pair of opposed electrical contacts 134, 136 as shown. Contact 134 is coupled to PCB 98 by way of a housing 130. Similarly, contact 136 is coupled via a housing 132 to PCB 98. Each electrical contact 134, 136 is generally flexible so that it may readily move into and out of contact with the other contact.

As spring drum 82 rotates, a radially protruding tab 140 mounted to a hub 142 of spring drum 82 rotates as well. Upon each full revolution of spring drum 82, tab 140 will bias contacts 134, 136 together. In the illustration of FIG. 6, spring drum 82 is rotating in direction 110, and thus tab 140 has biased contact 134 into contact with 136.

Controller 60 is operable to detect when electrical contacts 134, 136 are in contact with one another, and records this information. Two successive contacts between electrical contacts 134, 136 signifies one full revolution of spring drum 82, which corresponds to a linear movement of spring 80 and hence a linear movement of pusher 26.

Direction sensor 64 is used to direction the rotational direction of spring drum 82 as movement is detected. Indeed, while two successive contacts of electrical contacts 134, 136 provides an indication of a linear distance moved by pusher 26, these contacts do not provide an indication of which direction pusher 26 was moving during that time. The operation of direction sensor 64 is thus used to correlate a direction with the movement detected.

Direction sensor 64 includes a first electrical contact 150, a second electrical contact 152, and a common electrical contact 154 interposed between first and second electrical contacts. Common electrical contact 154 is resiliently movable into contact with either one of first or second electrical contacts 150, 152. Each of these contacts, 150, 152, and 154 are insulated from one another via a housing 156, and coupled to PCB 98.

For example, as spring drum 82 rotates in direction 110 as shown, a distal end of common electrical contact 154 is intermittently but repeatedly contacted by the teeth of gear teeth 90a, and repeatedly brought into contact with first electrical contact 150. Conversely, when spring drum 82 rotates in direction 112 (see FIG. 5), common electrical contact 154 is repeatedly brought into contact with second electrical contact 152. Controller 60 is operable to recognize that successive contact between common electrical contact 154 and first electrical contact 150 is indicative of pusher 26 moving toward the front of shelf 24 (see e.g., FIGS. 1, 2). Conversely, controller 60 is also operable to recognize that successive contact between common electrical contact 154 and second electrical contact 152 is indicative of pusher 26 moving toward the rear of shelf 24 (see e.g., FIGS. 1, 2).

It will be recognized, however, that spring drum sensor 62 can detect only large-scale movement of pusher. As used herein, "large-scale movement" means movement of pusher 26 which corresponds to one full revolution of spring drum 82. In order to determine incremental movement of pusher 26, incremental distance sensor 66 is employed. As used herein, "incremental movement" of pusher 26 means movement that is less than a large-scale movement. Indeed, in a single movement cycle, i.e., an uninterrupted movement of pusher 26, the same may move some distance prior to and/or after the two successive contacts of contacts 134, 136 that signifies one large-scale movement. Incremental distance sensor 66 is thus used to determine this additional distance.

Figure 7:
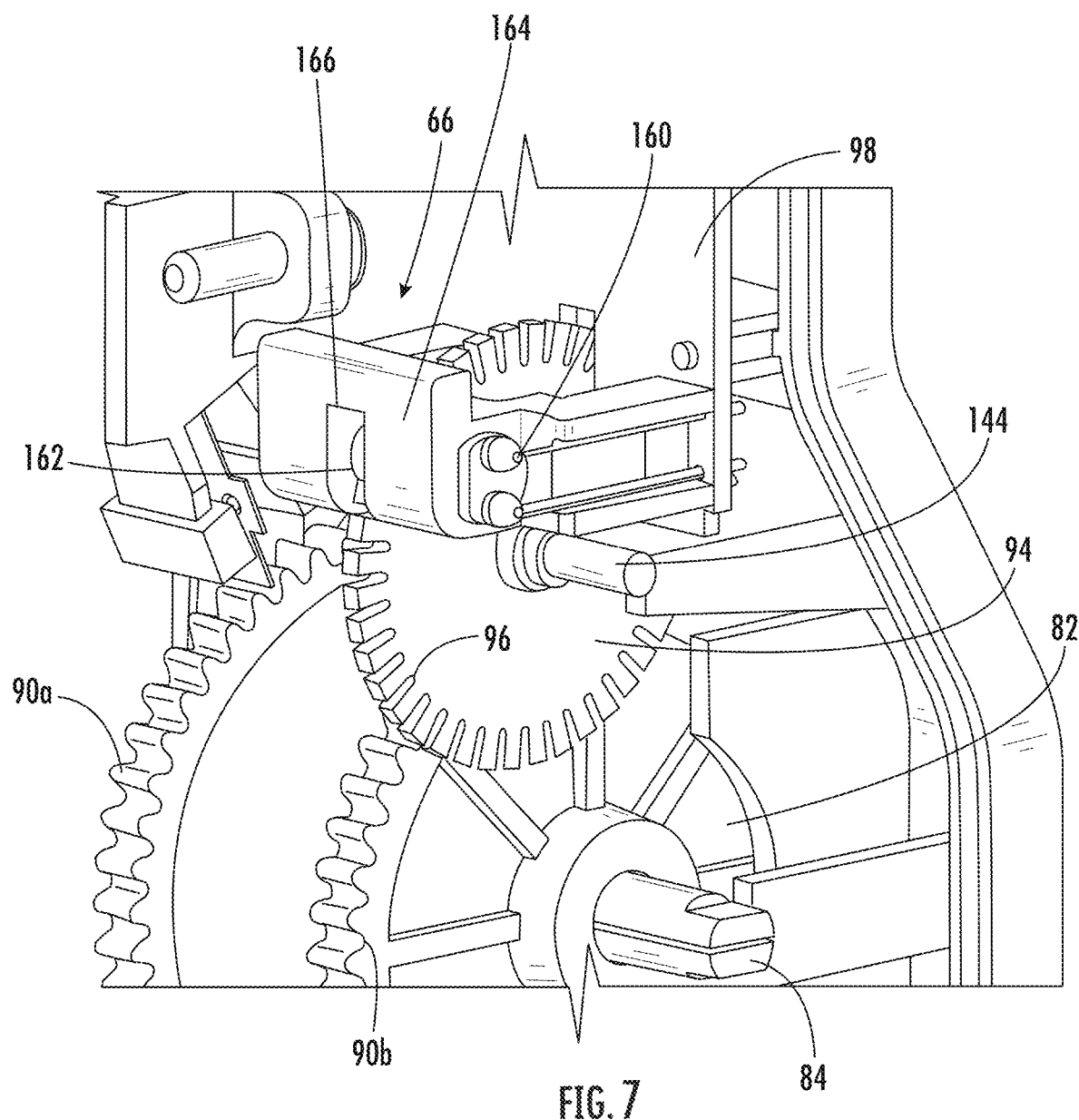
FIG. 7 is another perspective view of the pusher, with a portion of its outer housing removed, according to an embodiment of the invention.
Figure 8:
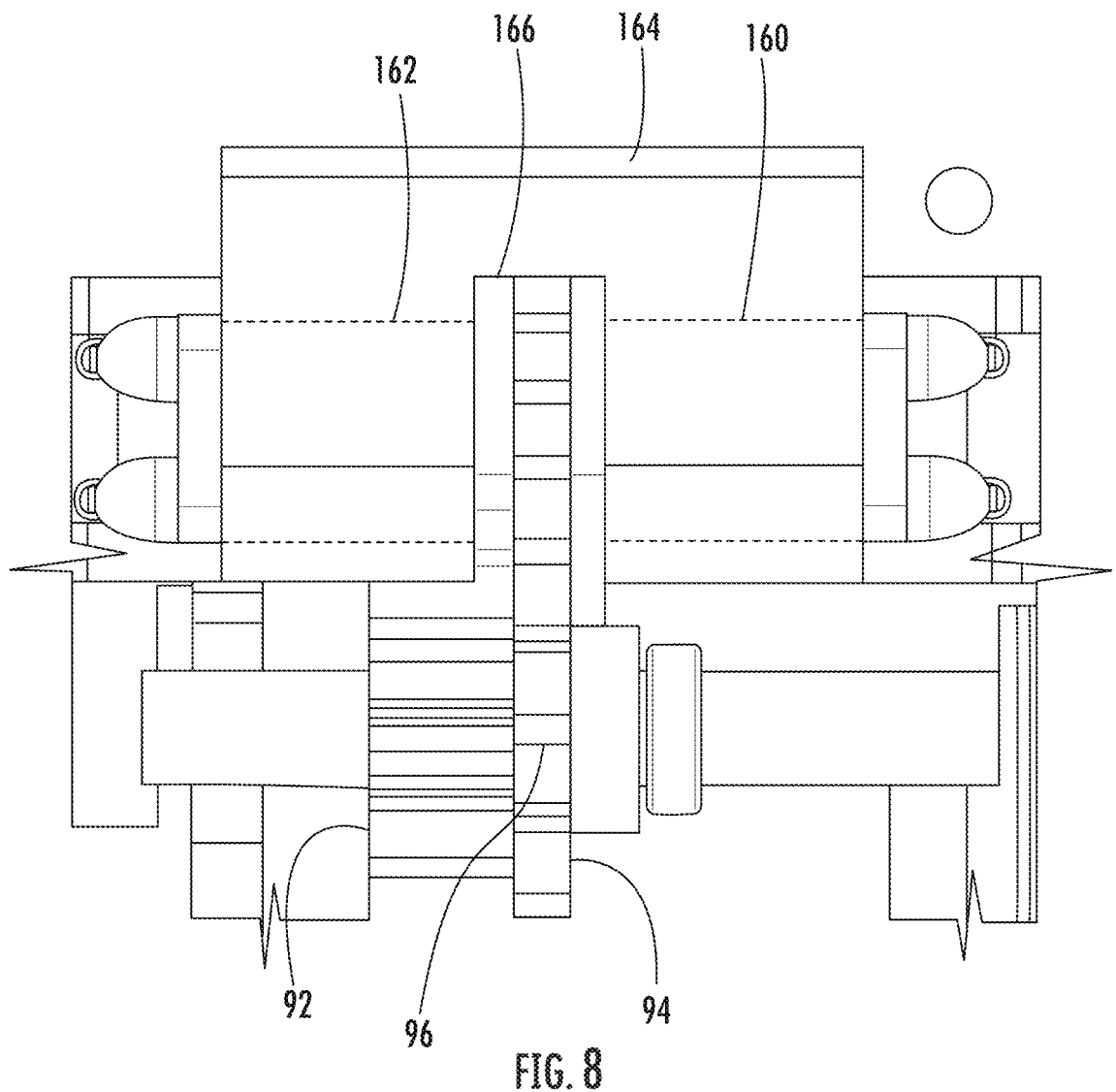
FIG. 8 is a partial front view of an incremental distance sensor of the pusher, according to an embodiment of the invention.

With reference to FIGS. 7 and 8, incremental distance sensor 66 includes the aforementioned sensing gear 92 and slotted disc 94, which are rotatable about an axis defined by shaft 144 upon a corresponding rotation in spring drum 82. Incremental distance sensor 66 also includes a light sensor arrangement comprising a light emitter 160 aimed at a light receiver 162 for detecting the presence or absence of a beam of light emitted from emitter 160. Emitter 160 and receiver 162 are mounted to a housing 164 as shown. Housing 164 includes a slot 164 which defines a sensing region. The peripheral region of slotted disc 94 rotates through this sensing region. The slots 96 thereby successively interrupt the beam of light from emitter 160.

As a result, receiver 162 detects pulses of light. Due to the equally spaced and regular arrangement of slots 96, these pulses thus each correspond to a small linear movement of pusher 26. Put differently, the pulses can be summed at controller 60 so as to determine a total distance moved by pusher 26 in any given movement cycle. Due to this very fine measurement, the resolution of distance measurement of pusher 26 is relatively high. As such, even very minor movements of pusher 26 corresponding for example very thin products 42 being removed can be detected. It will be recognized that incremental distance sensor 66 thus functions as a rotary encoder used for linear distance measurement.

The following provides an example of the distance measurement functionality of pusher 26. In this particular example, the gear ratio between spring drum 82 and sensing gear 92 is 1:4. Spring drum 82 has an outer diameter of 13.5 mm. As a result, one full revolution of spring drum 82 as detected by spring drum sensor 62 corresponds to 84.8 mm (i.e., 2*pi*13.5). Also in this example, there are 40 slots 96 formed on slotted disc 94. As such, one full revolution of slotted disc 94 generates 40 light pulses. Due to the aforementioned 1:4 gear ratio, one full revolution of spring drum 82 will cause four full revolutions of slotted disc 94, and hence 160 light pulses for every one full revolution of spring drum 82. Dividing the circumference of spring drum 82 by this total number of pulses, (i.e., 84.8 mm/160 pulses) each pulse therefor corresponds to 0.53 mm of linear movement.

For the purposes of this example, it will be assumed that pusher 26 has moved 200 mm in a movement cycle. From start to finish in this movement cycle, pusher 26 will first move some distance prior to contacts 134, 136 making their first contact. These contacts 134, 136 will then make a second contact after spring drum 82 completes a full revolution (i.e., a revolution as measured by a first and a second contact of contacts 134, 136). Contacts 134, 136 will then make a third contact after another full revolution of spring drum 82 (i.e., as measured by the third contact of contacts 134, 136 occurring after the aforementioned second contact). Pusher will then move some distance after this third contact.

During the aforementioned movement, incremental distance sensor 66 sensed pulses of light. Assume for this example 15 pulses were detected prior to the first contact of contacts 134, 136, this distance portion correlates to a distance of 15*0.53 mm or 7.95 mm. Also assume for this example that 42 pulses were detected after the third contact of contacts 134, 136, this distance portion correlates to a distance of 42*0.53 mm or 22.26 mm. Also, as already mentioned, three total contact events between contacts 134, 136 were detected, which amounts to two full revolutions of spring drum 82, correlating to a distance portion of 169.6 mm. Summing the aforementioned distance portions, a total travel distance of approximately 200 mm has been detected.

In terms of loss prevention, the user can set an alarm threshold distance using threshold distance control 104 which may be a button, switch, dial, or any similarly suitable means for setting the alarm threshold distance. This threshold distance is the distance in a movement cycle observed by pusher 26 in which an alarm will be generated. The pusher 26 may include a control, similar to the threshold distance control 104, which allows the user to adjust a time period during which the alarm threshold distance must be exceeded in order to generate the alarm. All distance measurements and alarm conditions can be transmitted to receiver 40. Further, receiver 40 may be in communication with or embody inventory management software such that in addition to loss prevention, each pusher assembly 22 can also communicate information regarding its stock status, etc. As such, receiver 40 may incorporate or be in communication with a user interface for inputting an alarm threshold and/or a product depth as discussed below. In general, the capability of high-resolution distance measurement can be used for anti-theft and inventory management functions.

Referring back momentarily to FIG. 1, in terms of inventory management, the data communicated by each pusher 26 is also associated with a unique location identifier for each pusher. This enables the inventory management software to differentiate between the various pushers 26 in the system, and monitor the inventory of each. As such, a user can also define a product size for, i.e., depth, for one item of product in the pusher assembly 22. The pusher 26 may then correlate the locally at controller 60, or remotely at receiver 40 or any inventory management software integrated with or in communication with receiver 40, the distance it has traveled to a number of products removed from pusher assembly 22. As an example, a user may indicate that a single item has a one-inch depth. A movement of ten inches, therefore, amounts to ten products being removed. A user may set this minimum product depth using threshold distance control 104, or they may set it at receiver 40 or the inventory management software embedded in or associated therewith. The threshold distance control 104 may be a dial, button, switch, or any suitable means for setting the minimum product depth.

Figure 9:
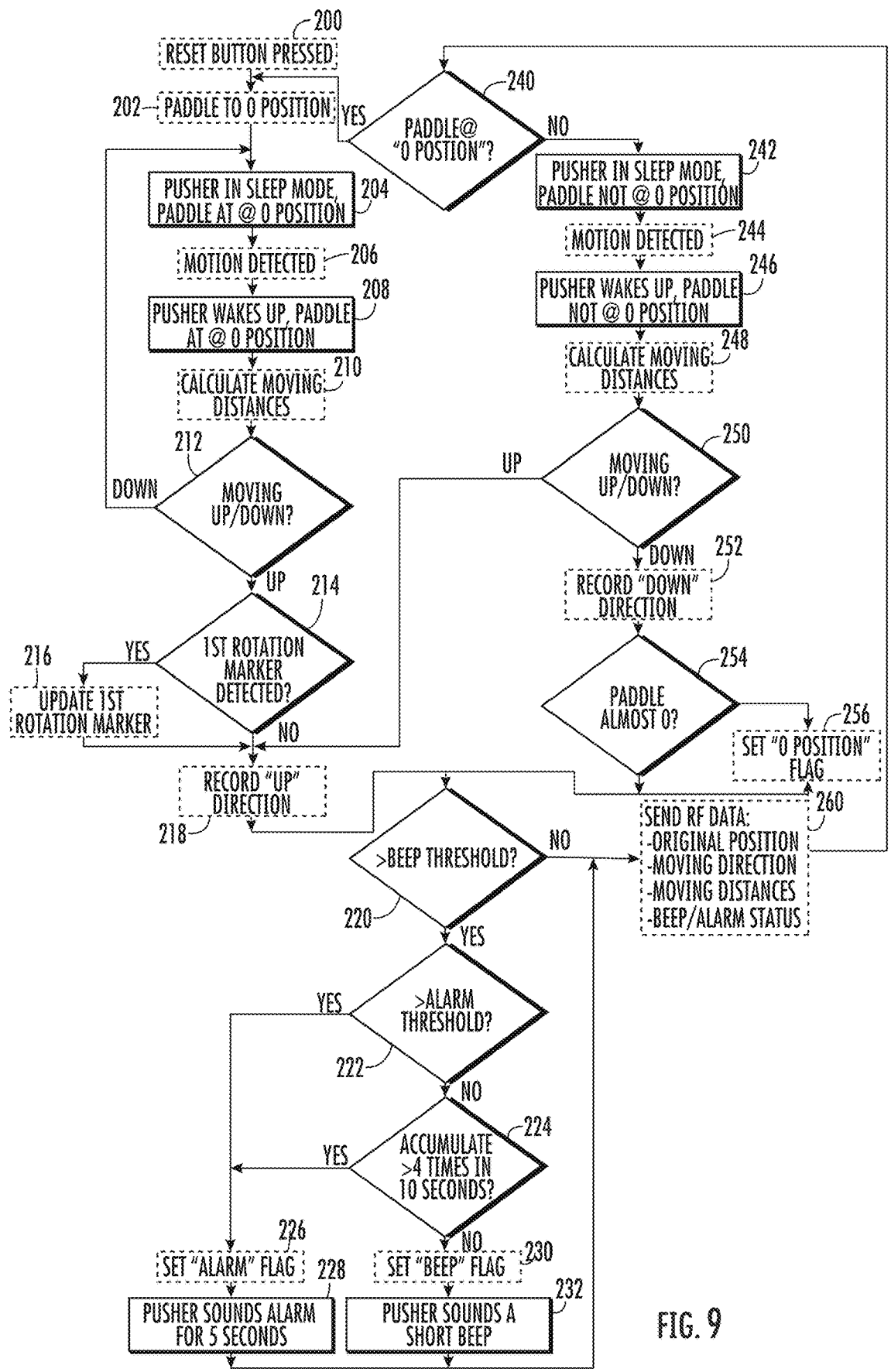
FIG. 9 is a flowchart of the motion detection and alarm functionality of the pusher, according to an embodiment of the invention.

Turning now to FIG. 9, the same illustrates the basic control logic of each pusher assembly 22. Starting at step 200, each pusher 26 must be "zeroed" by activating its reset control, such as a switch, dial, or button, when no product 42 is loaded therein, i.e., when coil spring 80 has drawn pusher 26 as close as is possible to the front of shelf 24. This is recorded at step 202 as the zero position. Thereafter, pusher 26 remains in sleep mode at step 204 until motion is detected at 206. Upon this detection, pusher 26 exits sleeps mode and monitors and calculates the distance it has moved at step 210 using the sensor arrangement described above.

At step 212 a determination is also made as to whether pusher 26 is moving up (i.e., toward the front of shelf 24) or down (i.e., toward the rear of shelf 24). If moving down, the process loops back to step 204. If moving up, the process continues to step 214 where a determination of whether the fist rotation marker (i.e., a contact of contacts 134, 136) has been detected. If yes, this information is updated at step 216. After step 216, or if no contact of contacts 134, 136 is detected, the process moves on to step 218 and records the distance moved forward. This distance is then analyzed at step 220 to see if it is greater than a first threshold, i.e., a "beep" threshold where only a temporary alarm is generated. If it is not greater than this threshold, at step 260 transmitter 72 then sends RF data corresponding to the original position of pusher 26, the distance pusher 26 moved, the direction pusher 26 moved, and an alarm status.

If, however, at step 220 the distance moved is such that the temporary alarm should be generated, at check is performed at step 222 to confirm whether or not the distance moved is great enough to warrant a full alarm. If yes, at step 226 the alarm status is saved and an alarm of five seconds in duration is generated at step 228. If, at step 222 it is determined that the alarm threshold has not been met, then an additional check at step 224 is performed to determine whether the threshold at step 220 has been exceeded within a time period of ten seconds. If no, the temporary alarm status is saved at step 230 and only the temporary alarm is generated at step 232. At the end of either of steps 228 or 232, RF information is sent at step 260.

If the check at step 220 is no, or if either of steps 228 or 232 are completed, the process then proceeds to step 240, to determine whether the pusher is at its previously-set zero position. If yes, then the foregoing steps are repeated as necessary upon movement of pusher 26. If not, the process moves onto step 242 where pusher 26 returns to sleep mode. Pusher 26 exits sleep mode at step 246 and monitors and calculates the distance it has moved at step 248. A determination at step 250 is conducted to determine whether the pusher has moved up or down in the same manner as described above relative to step 212. If moving up, the process proceeds to step 218 and continues as described above. If moving down, this distance is recorded at step 252. A determination is then made at step 254 as to whether pusher 26 has returned to its zero position. If so, it is recorded at step 256 that the pusher is at its zero position, and the process continues to step 220. If not, nothing is recorded, and the process continues to step 220.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents cited herein are hereby incorporated by reference to the same extent as if each reference were individually and specifically indicated to be incorporated by reference and were set forth in its entirety herein.

What is claimed is:

1. A retail merchandise pusher configured for sliding along a track of a pusher assembly, the pusher assembly mountable to a retail merchandise shelf, the pusher comprising:

a housing;
a spring drum rotatably mounted within the housing;
a coil spring mounted to the spring drum, the coil spring coilable and uncoilable upon rotation of the spring drum; and
a controller coupled to a sensor arrangement carried within the housing, the sensor arrangement comprising:
   a spring drum sensor for detecting rotation of the spring drum;
   a direction sensor for detecting a direction of rotation of the spring drum; and
   an incremental distance sensor for detecting an incremental movement of the pusher;
wherein the controller is configured to calculate, based on data from the sensor arrangement, a total distance and direction of travel by the pusher, and to generate an alarm when the pusher travels more than a threshold distance within a predetermined period of time; and
wherein the incremental distance sensor includes a sensing gear in contact with the spring drum, and a slotted disc mounted to the sensing gear, the incremental distance sensor further comprising a light sensor arrangement configured to produce and detect a beam of light.

2. The retail merchandise pusher of claim 1, wherein the alarm is at least one of a visual, audible, or RF signal.

3. The retail merchandise pusher of claim 2, wherein the controller is coupled to an output device disposed in the housing, the output device configured to produce the alarm as a visual or audible signal.

4. The retail merchandise pusher of claim 1, wherein the controller is coupled to a transmitter disposed in the housing, the transmitter configured to wirelessly transmit data to a remote receiver, the data including at least one of an alarm status, and the total distance and direction of travel by the pusher.

5. The retail merchandise pusher of claim 4, wherein the controller is configured to transmit information, based on data from the sensor arrangement, wherein the information includes an inventory status for the pusher assembly.

6. The retail merchandise pusher of claim 1, wherein the controller comprises a microprocessor.

7. The retail merchandise pusher of claim 1, wherein the direction sensor includes a first electrical contact, a common electrical contact, and a second electrical contact, the common electrical contact interposed between the first electrical contact and the second electrical contact.

8. The retail merchandise pusher of claim 7, wherein a distal end of common electrical contact is intermittently in contact with gear teeth formed on an outer periphery of the spring drum such that the common electrical contact is biased by the gear teeth into contact with the first electrical contact when the spring drum rotates in a first direction, and biased by the gear teeth into contact with the second electrical contact when the spring drum rotates in a second rotational direction opposite the first rotational direction.

9. The retail merchandise pusher of claim 1, wherein a peripheral region of the slotted disc is movable through a sensing region through which the beam of light extends, wherein the peripheral region includes a plurality of slots formed therein, wherein the plurality of slots sequentially pass through the sensing region as the sensing gear rotates such that the beam of light alternately passes through and is blocked by the plurality of slots.

10. The retail merchandise pusher of claim 9, wherein the light sensor arrangement includes a light emitter located on a first side of the slotted disc, and a light sensor located on a second side of the slotted disc opposite the first side, the light sensor arranged to detect the beam of light emitted by the light emitter.

11. The retail merchandise pusher of claim 10, wherein the light emitter is arranged to emit the beam of light such that it is perpendicular to a plane of rotation defined by the slotted disc.

12. The retail merchandise pusher of claim 1, wherein the coil spring is configured to bias the housing toward one end of the track.

13. The retail merchandise pusher of claim 1, wherein the pusher is configured to permit a user to set or adjust at least one of the threshold distance and the predetermined period of time.

14. The retail merchandise pusher of claim 1, wherein the pusher includes a reset control to set a zero position for the controller, the zero position indicating that no merchandise is contained in the pusher assembly such that the pusher is at an end of the track.

15. A pusher assembly configured for mounting to a retail shelf, the shelf having a front and a back, wherein retail merchandise situated near the front of the shelf is removable from the pusher assembly, the pusher assembly comprising:
   a track;
   a pusher mounted to the track, the pusher slidable toward and away from the front of the shelf, the pusher comprising a controller coupled to a sensor arrangement for detecting movement and a direction of travel by the pusher, the controller configured to calculate, based on data from the sensor arrangement, a total distance traveled by the pusher along the track, the controller further configured to generate an alarm when the pusher travels more than a threshold distance within a predetermined period of time;
   wherein the sensor arrangement includes a spring drum sensor, a direction sensor, and an incremental distance sensor; and
   wherein the incremental distance sensor includes a sensing gear in contact with the spring drum the gear including a slotted disc mounted to the gear, the incremental distance sensor further comprising a light sensor arrangement configured to produce and detect a beam of light.

16. The pusher assembly of claim 15, wherein the direction sensor includes a first electrical contact, a common electrical contact, and a second electrical contact, the common electrical contact interposed between the first electrical contact and the second electrical contact.

17. The pusher assembly of claim 15, wherein the alarm is at least one of a visual, audible, or RF signal, and the controller is coupled to a transmitter configured to wirelessly transmit data to a remote receiver, the data including at least one of an alarm status, and the total distance and direction of travel by the pusher.

18. The pusher assembly of claim 15, wherein the pusher is configured to permit a user to set or adjust at least one of the threshold distance and the predetermined period of time, and includes a reset control to set a zero position for the controller, the zero position indicating that no merchandise is contained in the pusher assembly such that the pusher is at an end of the track.

19. The pusher assembly of claim 15, wherein the controller is configured to provide, based on data from the sensor arrangement, an inventory status of the pusher assembly.

20. A retail merchandise display system for self-facing retail merchandise, the retail merchandise display comprising:
　a shelf;
　at least one pusher assembly mounted to the shelf, the at least one pusher assembly comprising:
　　a track;
　　a pusher slidable along the track, the pusher assembly comprising a controller coupled to a sensor arrangement that includes a spring drum sensor, a direction sensor, and an incremental distance sensor, the incremental distance sensor includes a sensing gear in contact with the spring drum the gear including a slotted disc mounted to the gear, the incremental distance sensor further comprising a light sensor arrangement configured to produce and detect a beam of light, the controller configured to calculate, based on data from the sensor arrangement, a large-scale movement of the pusher, and an incremental movement by the pusher, wherein the controller is configured to generate a local alarm when a total distance traveled by the pusher, the total distance being equal to a sum of the large-scale movement and the incremental movement, is greater or equal to a predefined distance; and
　　the pusher including a transmitter operable to wirelessly communicate the total distance traveled by the pusher; and
　a receiver, remotely located from the pusher, is configured to receive a wireless signal from the transmitter, and configured to generate a remote alarm in concert with the local alarm.

21. The retail merchandise display system of claim 20, wherein the local and remote alarms are at least one of visual or audible alarms.

22. The retail merchandise display system of claim 20, wherein the at least one pusher assembly includes a plurality of pusher assemblies, wherein each one of the plurality of pusher assemblies wirelessly communicate with the receiver.

23. The retail merchandise display system of claim 20, wherein the receiver includes an RF receiver, an audio speaker, and a Wi-Fi module configured to transmit data received from the pusher.

24. The retail merchandise system of claim 20, wherein the wireless signal is an RF signal.

25. The retail merchandise display system of claim 20, wherein the receiver is configured to transmit data received from the pusher to a computer or mobile device, wherein the data allows the computer or mobile device to display information regarding the pusher assembly.

26. The retail merchandise display system of claim 25, wherein the information regarding the pusher assembly includes at least one of an alarm status, an inventory status, and a position of the pusher.

* * * * *